(12) United States Patent
Schmitz et al.

(10) Patent No.: US 7,175,896 B2
(45) Date of Patent: *Feb. 13, 2007

(54) COMPOSITE HAVING TWO OR MORE LAYERS, INCLUDING AN EVOH LAYER

(75) Inventors: Guido Schmitz, Duelmen (DE); Harald Haeger, Recklinghausen (DE); Hans Ries, Marl (DE); Wilfried Bartz, Marl (DE)

(73) Assignee: Degussa AG, Duesseldorf (DE)

( * ) Notice: Subject to any disclaimer, the term of this patent is extended or adjusted under 35 U.S.C. 154(b) by 57 days.

This patent is subject to a terminal disclaimer.

(21) Appl. No.: 10/681,279

(22) Filed: Oct. 9, 2003

(65) Prior Publication Data

US 2004/0265527 A1    Dec. 30, 2004

Related U.S. Application Data

(63) Continuation of application No. 10/024,386, filed on Dec. 21, 2001, now abandoned.

(30) Foreign Application Priority Data

Dec. 21, 2000   (DE) ............... 100 64 333

(51) Int. Cl.
| | |
|---|---|
| B32B 1/08 | (2006.01) |
| B32B 27/08 | (2006.01) |
| B32B 27/30 | (2006.01) |
| B32B 27/34 | (2006.01) |
| B29D 23/00 | (2006.01) |
| F16L 11/04 | (2006.01) |
| F16L 11/20 | (2006.01) |

(52) U.S. Cl. ............ 428/36.9; 428/36.91; 428/36.6; 428/474.4; 428/474.9; 138/137

(58) Field of Classification Search ........... 428/36.9, 428/36.91, 36.6, 474.4, 474.9; 138/137
See application file for complete search history.

(56) References Cited

U.S. PATENT DOCUMENTS

| | | | |
|---|---|---|---|
| 3,442,975 A | 5/1969 | Cawthon et al. ............ 525/417 |
| 4,407,873 A | 10/1983 | Christensen et al. ....... 428/35.4 |
| 4,816,304 A * | 3/1989 | Nohara et al. .............. 428/36.7 |
| 5,038,833 A | 8/1991 | Brunnhofer ................ 138/137 |
| 5,076,329 A | 12/1991 | Brunnhofer ................ 138/137 |
| 5,167,259 A | 12/1992 | Brunnhofer ................ 138/137 |
| 5,219,003 A | 6/1993 | Kerschbaumer ............ 138/137 |
| 5,292,789 A * | 3/1994 | Ishida et al. ............... 524/320 |
| 5,313,987 A | 5/1994 | Rober et al. ................ 138/137 |
| 5,362,530 A * | 11/1994 | Kitami et al. .............. 428/36.2 |
| 5,404,915 A | 4/1995 | Mugge et al. .............. 138/137 |
| 5,449,024 A | 9/1995 | Rober et al. ................ 138/137 |
| 5,460,771 A | 10/1995 | Mitchell et al. ............ 264/508 |
| 5,474,822 A | 12/1995 | Rober et al. .............. 428/36.91 |
| 5,478,620 A | 12/1995 | Mugge et al. ............ 428/36.91 |
| 5,500,263 A | 3/1996 | Rober et al. ............... 428/36.6 |
| 5,512,342 A | 4/1996 | Rober et al. ............. 428/36.91 |
| 5,554,425 A | 9/1996 | Krause et al. ........... 428/36.91 |
| 5,554,426 A | 9/1996 | Rober et al. ............. 428/36.91 |
| 5,706,865 A | 1/1998 | Douchet .................... 138/125 |
| 5,798,048 A | 8/1998 | Ries .......................... 210/767 |
| 5,858,492 A | 1/1999 | Roeber et al. ........... 428/36.91 |
| 5,859,148 A | 1/1999 | Borggreve et al. ......... 525/420 |
| 6,033,749 A | 3/2000 | Hata et al. ................. 428/36.7 |
| 6,131,618 A | 10/2000 | Brudny et al. ............. 138/177 |
| 6,161,879 A | 12/2000 | Ries et al. .................. 285/330 |
| 6,177,162 B1 * | 1/2001 | Siour et al. ............. 428/36.91 |
| 6,177,516 B1 | 1/2001 | Hudak ........................ 525/71 |
| 6,302,153 B1 | 10/2001 | Merziger ................... 138/137 |
| 6,335,101 B1 | 1/2002 | Haeger et al. ............ 428/475.2 |
| 6,355,358 B1 | 3/2002 | Boer et al. ............... 428/474.4 |
| 6,386,240 B1 | 5/2002 | Roeber et al. ............. 138/137 |
| 6,391,982 B1 | 5/2002 | Haeger et al. ............. 525/417 |
| 6,451,395 B1 | 9/2002 | Ries et al. ................. 428/36.8 |
| 6,528,137 B2 | 3/2003 | Franosch et al. .......... 428/36.9 |
| 6,538,073 B1 | 3/2003 | Oenbrink et al. .......... 525/420 |
| 6,592,955 B1 | 7/2003 | Dupont et al. ............ 428/35.7 |
| 6,670,004 B1 * | 12/2003 | Green ....................... 428/35.7 |
| 6,677,015 B2 * | 1/2004 | Himmelmann et al. .... 428/35.7 |
| 6,680,093 B1 | 1/2004 | Ries et al. ................. 428/36.6 |
| 6,726,999 B2 | 4/2004 | Schueler et al. ......... 428/474.9 |
| 6,783,821 B2 * | 8/2004 | Ries et al. ................. 428/34.1 |
| 6,794,048 B2 | 9/2004 | Schmitz et al. .......... 428/474.7 |
| 2001/0018105 A1 | 8/2001 | Schmitz et al. .......... 428/36.91 |
| 2002/0012806 A1 | 1/2002 | Flepp et al. .............. 428/474.9 |

(Continued)

FOREIGN PATENT DOCUMENTS

CA    2 312 582 A1    12/2000

(Continued)

OTHER PUBLICATIONS

U.S. Appl. No. 10/024,379, filed Dec. 21, 2001, Ries et al.

(Continued)

*Primary Examiner*—Rena Dye
*Assistant Examiner*—Chris Bruenjes
(74) *Attorney, Agent, or Firm*—Oblon, Spivak, McClelland, Maier & Neustadt, P.C.

(57) ABSTRACT

A layered composite contains the following layers: (I) a layer I composition containing (a) from 0 to 80 parts by weight of at least one polyamide; (b) from 0 to 100 parts by weight of at least one polyamine-polyamide copolymer; and (c) from 0 to 80 parts by weight of at least one polyamide; and (II) a layer II composition containing at least one ethylene-vinyl alcohol copolymer.

60 Claims, No Drawings

U.S. PATENT DOCUMENTS

| | | | |
|---|---|---|---|
| 2002/0082352 A1 | 6/2002 | Schmitz et al. | 525/179 |
| 2002/0119272 A1 | 8/2002 | Ries et al. | 428/36.91 |
| 2002/0142118 A1 | 10/2002 | Schmitz et al. | 428/35.7 |
| 2003/0072987 A1 | 4/2003 | Ries et al. | 429/34 |
| 2004/0202908 A1 | 10/2004 | Schmitz et al. | 429/30 |
| 2004/0265527 A1 | 12/2004 | Schmitz et al. | 428/36.91 |

FOREIGN PATENT DOCUMENTS

| | | | |
|---|---|---|---|
| CN | 1273171 A | | 11/2000 |
| DE | 40 01 125 C1 | | 12/1990 |
| DE | 40 01 126 C1 | | 12/1990 |
| DE | 100 05 641 A1 | | 1/2001 |
| EP | 0 246 102 | | 11/1987 |
| EP | 0 428 833 | | 5/1991 |
| EP | 0 445 706 | | 9/1991 |
| EP | 0 683 210 A2 | | 11/1995 |
| EP | 0 780 431 | | 6/1997 |
| EP | 1 036 968 | | 9/2000 |
| EP | 1 065 048 A2 | | 1/2001 |
| EP | 1 162 061 | | 12/2001 |
| EP | 1 216 823 A2 | | 6/2002 |
| EP | 1 216 825 A2 | | 6/2002 |
| EP | 1 216 826 A2 | | 6/2002 |
| JP | 3-106646 | | 5/1991 |
| JP | 2001-71436 A | | 3/2001 |
| JP | 2002-213659 | | 7/2002 |
| WO | WO 00/21750 | | 4/2000 |

OTHER PUBLICATIONS

U.S. Appl. No. 10/025,547, filed Dec. 26, 2001, Schmitz et al.
U.S. Appl. No. 10/021,355, Dec. 19, 2001, Himmelmann et al.
Derwent Search Report; Accession No. 2001-184247; "Thermoplastic multilayer composite e.g. for fuel lines or tanks, has layers of e.g. polyamide and polyester with coupling layer of graft copolymer based on polyamine and polyamide monomers".
U.S. Appl. No. 11/240,493, filed Oct. 3, 2005, Schmitz et al.
U.S. Appl. No. 11/246,274, filed Oct. 11, 2005, Schmitz et al.
U.S. Appl. No. 11/246,206, filed Oct. 11, 2005, Schmitz et al.
U.S. Appl. No. 07/833,701, filed Feb. 11, 1992, Mugge et al.
U.S. Appl. No. 08/187,891, filed Jan. 28, 1994, Boer et al.
Patent Abstracts of Japan—English Abstract of JP 2002213659.
esp@cenet—English Abstract of EP1216826.
esp@cemet—English Abstract of EP 1216823.
esp@cemet—English Abstract of EP1216825.
Introduction to Kuraray EVAL™ Resins, Version 1.2/9810, Duraray EVAL Europe, pp. 1-15.
BR 200002904 A—Abstract Only—esp@cenet, corresponds to U.S. 6,355,358.
CZ 2000002436 A3—Abstract Only See patent family member of BR 20002904 as shown by Derwent Search Report, corresponds to U.S. 6,355,358.
CN 1290601 A—Abstract Only See patent family member BR 20002904 as shown by Derwent Search Report, corresponds to U.S. 6,355,358.
KR 2001049644 A—Abstract Only See patent family member BR 20002904 as shown by Derwent Search Report, corresponds to U.S. 6,355,358.
Derwent Search Report; Accession No. 2001-184247; "Thermoplastic multilayer composite e.g. for fuel lines for tanks, has layers of e.g. polyamide and polyester with coupling layer or graft copolymer based on polyamine and polyamide monomers".
U.S. Appl. No. 11/357,971, filed Feb. 22, 2006, Schmitz et al.

* cited by examiner

COMPOSITE HAVING TWO OR MORE LAYERS, INCLUDING AN EVOH LAYER

BACKGROUND OF THE INVENTION

1. Field of the Invention

The invention relates to a composite having two or more layers and including a barrier layer made from EVOH, and also including a layer made from a molding composition which includes a polyamide blend. The invention further relates to a molding composition of this type which includes a polyamide copolymer.

2. Discussion of the Background

When composites having two or more layers are developed, for example, for use as a tube for carrying liquid or gaseous media in motor vehicles, the molding compositions must have sufficient chemical resistance to the media to be carried, and the tubes must meet all the mechanical requirements placed upon them, even after long exposure to fuels, oils or heat. In addition to meeting the requirement for adequate fuel resistance, the automotive industry demands improved barrier action from fuel piping, in order to reduce emissions of hydrocarbons within the environment. This has led to the development of tube systems having two or more layers, for example using EVOH as barrier layer material. However, EVOH is incompatible with PA11, PA12, PA612, PA1012 and PA1212, which can be used for the outer layer since they have good mechanical properties, good water absorption performance, and low susceptibility to environmental effects. It is therefore impossible to obtain the adhesion between the two layers that is indispensable for the application.

However, EVOH is compatible with PA6, PA66, PA6/66, and with maleic-anhydride-functionalized polyolefins. Molding compositions based on polymers of this type are, however, unsuitable as outer layer material.

DE-C 40 01 125 describes a motor vehicle pipeline composed of a tubular outer layer made from PA11 or PA12, an intermediate layer made from PA6, a barrier layer made from EVOH, and an inner layer made from PA6. A thin adhesion-promoter layer made from polyethylene or polypropylene, these being functionalized with maleic anhydride, is arranged between the outer layer and the intermediate layer.

A similar system is described in DE-C 40 01 126, where the motor vehicle pipeline is composed of a tubular outer layer made from PA11 or PA12, of a barrier layer made from EVOH, and of an adhesion-promoter layer situated between these and made from polyethylene or polypropylene, these being maleic-anhydride-functionalized.

However, the automotive industry has for some time required increased stability at relatively high temperature. This excludes solutions which include a polyolefin layer, since these have low heat resistance.

It has also been found ta prolonged contact with aqueous liquids or alcohol-containing fuel, in particular with heat, rapidly reduces the layer adhesion between functionalized polyolefin and polyamide, and this adhesion finally falls to values which are unacceptable in industry. The cause of this is thought to be alcoholysis or hydrolysis reactions.

SUMMARY OF THE INVENTION

One object of the present invention is to provide a composite having two or more layers in which ail of the layers of the composite have adequate heat resistance.

Another object of the present invention is to provide a composite having two or more layers, which includes an EVOH barrier layer, and in which the layers have adequate heat resistance.

Another object of the present invention is to achieve secure bonding of an EVOH barrier layer to a layer composed of a molding composition based on PA11, PA12, PA612, PA1012 or PA1212, without any use of a polyolefin layer as an adhesion promoter.

Another object of the present invention is to provide a composite having two or more layers, which includes an EVOH layer, and in which the layer adhesion in the composite is substantially retained even after prolonged contact with alcohol-containing or aqueous media, with heat.

These and other objects have been achieved with the present invention, the fist embodiment of which provides a layered composite, which includes the following layers:

(I) a layer I composition including:
  (a) from 0 to 80 parts by weight of at least one polyamide selected from the group including PA6, PA66, PA6/66 and mixtures thereof;
  (b) from 0 to 100 parts by weight of at least one polyamine-polyamide copolymer that includes the following monomer units:
    (α) from 0.5 to 25% by weight, based on the weight of the polyamine-polyamide copolymer, of at least one polyamine having at least 4 nitrogen atoms and having a number-average molar mass $M_n$ of at least 146 g/mol, and
    (β) at least one polyamide-forming monomer selected from the group including lactam, ω-aminocarboxylic acid, equimolar combination of diamine and dicarboxylic acid, and mixtures thereof, and
  (c) from 0 to 80 parts by weight of at least one polyamide selected from the group including PA11, PA12, PA612, PA1012, PA1212 and mixtures thereof;
  wherein, in the layer I, a total of the parts by weight of (a), (b) and (c) is 100;
  wherein within an entirety of (a) and (b), at least 20 parts by weight of the entirety include monomer units selected from the group including caprolactam, combination of hexamethylenediamine/adipic acid, and mixtures thereof; and
  wherein within an entirety of (b) and (c), at least 20 parts by weight of the entirety include monomer units selected from the group including ω-aminoundecanoic acid, laurolactam, combination of hexamethylenediamine/1,12-dodecanedioic acid, combination of 1,10-decanediamine/1,12-dodecanedioic acid, combination of 1,12-dodecanediamine/1,12-dodecanedioic acid, and mixtures thereof; and (II) a layer II composition which includes at least one ethylene-vinyl alcohol copolymer.

Another embodiment of the present invention provides a method for preparing the above-mentioned composite, which includes at least one selected from the group including multicomponent injection molding, coextrusion, and coextrusion blow molding at least one of the layer I, II, or both.

Another embodiment of the present invention provides a molding composition, which includes the following components:

(a) from 0 to 80 parts by weight of at least one polymide selected from the group including PA6, PA66, PA6/66 and mixtures thereof;

(b) from 0.5 to 100 par by weight of at least one polyamine-polyamide copolymer which includes the following monomer units:

(α) from 0.5 to 25% by weight, based on the weight of the polyamine-polyamide copolymer, of at least one polyamine having at least 4 nitrogen atoms and having a number-average molar mass $M_n$ of at least 146 g/mol, and (β) at least one polyamide-forming monomer selected from the group including lactam, ω-aminocarboxylic acid, equimolar combination of diamine and dicarboxylic acid, and mixtures thereof; and (c) from 0 to 80 parts by weight of at least one polyamide selected from the group including PA11, PA12, PA612, PA1012, PA1212 and mixtures thereof, wherein, a total of the parts by weight of (a), (b) and (c) is 100;

wherein within an entirety of (a) and (b), at least 20 parts by weight of the entirety include monomer units selected from the group including caprolactam, combination of hexamethylenediamine/adipic acid, and mixtures thereof; and wherein within an entirety of (b) and (c), at least 20 parts by weight of the entirety include monomer units selected from the group including ω-aminoundecanoic acid, laurolactam, combination of hexamethylenediamine/1,12-dodecanedioic acid, combination of 1,10 decanediamine/1,12-dodecanedioic acid, combination of 1,12-dodecanediamine/1,12-dodecanedioic acid, and mixtures thereof.

Another embodiment of the present invention provides a molding composition, which includes the following components:

(a) from 0 to 80 parts by weight of at least one polyamide selected from the group including PA6, PA66, PA6/66 and mixtures thereof;

(b) from 0 to 100 parts by weight of at least one polyamine-polyamide copolymer which includes the following monomer units:

(α) from 0.5 to 25% by weight, based on the polyamine-polyamide copolymer, of a polyamine having at least 4 nitrogen atoms and having a number-average molar mass $M_n$ of at least 146 g/mol, and (β) at least one polyamide-forming monomer selected from the group including lactam, ω-aminocarboxylic acid, equimolar combination of diamine and dicarboxylic acid, and mixtures thereof; and (c) from 0 to 80 parts by weight of at least one polyamide selected from the group including PA11, PA12, PA612, PA1012, PA1212 and mixtures thereof;

wherein a total of the parts by weight of (a), (b) and (c) is 100;

wherein within an entirety of (a) and (b), at least 20 part by weight of the entirety include monomer units selected from the group including caprolactam, combination of hexamethylenediamine/adipic acid, and mixtures thereof;

wherein within an entirety of (b) and (c), at least 20 parts by weight of the entirety include monomer units selected from the group including ω-aminoundecanoic acid, laurolactam, combination of hexamethylenediamine/1,12-dodecanedioic acid, combination of 1,10-decanediamine/1,12-dodecanedioic acid, combination of 1,12-dodecanediamine/1,12-dodecanedioic acid, and mixtures thereof; and wherein the molding composition includes at least one block copolymer which includes (a) and (c) monomer units.

Another embodiment of the present invention provides a tubular article selected from the group including fuel pipe, brake-fluid pipe, coolant pipe, hydraulic-fluid pipe, fuel-pump pipe, air-conditioner pipe, and a vapor line, which includes one or more of the above-mentioned composites and/or compositions.

Another embodiment of the present invention provides an article selected from the group including a container, fuel container, filler pipe, and filler pipe for a tank, which includes one or more of the above-mentioned composites and/or compositions.

Another embodiment of the present invention provides a film, which includes one or more of the above-mentioned composites and/or compositions.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Preferably, the present invention provides a composite having two or more layers and including the following layers:

I. a layer I made from a molding composition which includes the following components:

a) from 0 to 80 pats by weight of a polyamide selected from PA6, PA66, PA6/66 and mixtures of these, b) from 0 to 100 parts by weight of a polyamine-polyamide copolymer and c) from 0 to 80 parts by weight of a polyamide selected from PA11, PA12, PA612, PA1012, PA1212 and mixtures of these, where the total of the parts by weight of components a), b) and c) is 100, and where in addition within the entirety of components a) and b), at least 20 parts by weight are composed of monomer units which derive from caprolactam and/or from the combination hexamethylenediamine/adipic acid, and within the entirety of components b) and c), at least 20 parts by weight are composed of monomer units which derive from ω-aminoundecanoic acid, laurolactam, the combination hexamethylenediamine/1,12-dodecanedioic acid, the combination 1,10-decanediamine/1,12-dodecanedioic acid, and/or the combination 1,12-dodecanediamine/1,12-dodecanedioic acid, and II. a layer II made from a molding composition which includes an ethylene-vinyl alcohol copolymer (EVOH).

The term, "PA" used herein is known in the art and is interchangeable with the term, "nylon".

Preferably, the layered composite of the present invention does not include a polyolefin layer as an adhesion promoter.

The molding composition of layer I preferably includes at least 0.5 part by weight, particularly preferably at least 10 parts by weight, with particular preference at lease 20 parts by weight, and very particularly preferably at least 30 parts by weight, of component a), the upper limit preferably being 70 parts by weight, and particularly preferably 60 parts by weight. These ranges include all values and subranges therebetween, including 0.9, 1, 2, 5, 15, 25, 35, 45, 55, 65, 67, and 69 parts by weight.

The molding composition of layer I preferably includes at least 0.5 part by weight, particularly preferably at least 2 parts by weight, with particular preference at least 5 parts by weight, and very particularly preferably at least 10 parts by weight, of component b), the upper limit preferably being 80 parts by weight, and particularly preferably 60 parts by weight, with particular preference 40 parts by weight. The corresponding molding compositions are likewise provided by the invention. These ranges include all values and subranges therebetween, including 0.9, 1, 3, 4, 6, 15, 25, 35, 45, 55, 65, 75, 77 and 79 parts by weight.

The molding composition of layer I preferably includes at least 0.5 part by weight, particularly preferably at least 10 parts by weight, with particular preference at least 20 parts by weight, and very particularly preferably at least 30 parts by weight, of component a), the upper limit preferably being 70 parts by weight, and particularly preferably 60 parts by weight. These ranges include all values and subranges therebetween, including 0.9, 1, 2, 5, 15, 25, 35, 45, 55, 65, 67, and 69 parts by weight.

In a preferred fist embodiment, the composite having two or more layers is composed of these two layers, I and II.

In another preferred, second, embodiment a layer made from a molding composition based on PA11, PA12, PA612, PA1012, and/or PA1212 is adjacent to layer I.

In a third preferred embodiment there is a layer made from a molding composition based on PA6, PA66, and/or PA6/66 between layer I and layer II. On the other side of the composite, i.e. adjacent to the layer II, there may, if desired, be one or more layers made from any desired molding composition which adheres to II.

In a fourth preferred embodiment there is again a layer I on the other side of the composite. Another layer may also follow, made from a molding composition based on PA11, PA12, PA612, PA1012, and/or PA1212. Mixtures are possible.

In a fifth preferred embodiment there is a layer made from a molding composition based on PA6, PA66, and/or PA6/66 on the other side of the composite, i.e. adjacent to the layer II.

In a sixth preferred embodiment at least one of the layers of the composite has been rendered electrically conductive in order to dissipate electrostatic charges generated by a moving medium. This is preferably the layer directly in contact with the moving medium.

In a seventh preferred embodiment there is another layer which has been rendered electrically conductive, firmly adhering to the layers of the composite.

In an eighth preferred embodiment the composite having two or more layers also includes a regrind layer. When composites of the invention are produced, waste constantly arises, for example from the start-up procedure on the extension plant, or in the form of flash during extrusion blow molding, or during finishing processes on tubes. There may be a regrind layer made from these wastes embedded, for example, between layer I and an outer layer made from a molding composition based on PA11, PA12, PA612, PA1012 or PA1212. Mixtures are possible. It is preferable in principle for the regrind layer to be embedded between two layers composed of molding compositions based on polyamide, since this can compensate for any possible brittleness of the regrind blend.

These and other embodiments may be combined with one another in any desired manner.

Some preferred layer configurations are listed below by way of example, and are not meant to be limiting unless otherwise specified.

| Configuration | Layer sequence |
|---|---|
| 1 | a) layer I |
|   | b) layer II |
| 2 | a) layer made from a molding composition based on PA11, PA12, PA612, PA1012, and/or PA1212 |
|   | b) layer I |
|   | c) layer II |
| 3 | a) layer made from a molding composition based on PA11, PA12, PA612, PA1012, and/or PA1212 |
|   | b) layer I |
|   | c) layer made from a molding composition based on PA6, PA66, and/or PA6/66 |
|   | d) layer II |
| 4 | a) layer made from a molding composition based on PA11, PA12, PA612, PA1012, and/or PA1212 |
|   | b) layer I |
|   | c) layer II |
|   | d) layer made from a molding composition based on PA6, PA66, and/or PA6/66 |
| 5 | a) layer I |
|   | b) layer II |
|   | c) layer I |
| 6 | a) layer made from a molding composition based on PA11, PA12, PA612, PA1012, and/or PA1212 |
|   | b) layer I |
|   | c) layer II |
|   | d) layer I |
| 7 | a) layer made from a molding composition based on PA11, PA12, PA612, PA1012, and/or PA1212 |
|   | b) layer I |
|   | c) layer II |
|   | d) layer I |

-continued

| Configuration | Layer sequence |
|---|---|
|  | e) layer made from a molding composition based on PA11, PA12, PA612, PA1012, and/or PA1212 |
| 8 | a) layer made from a molding composition based on PA11, PA12, PA612, PA1012, and/or PA1212 |
|  | b) regrind layer |
|  | c) layer I |
|  | d) layer II |
|  | e) layer made from a molding composition based on PA6, PA66, and/or PA6/66 |
| 9 | a) layer made from a molding composition based on PA11, PA12, PA612, PA1012, and/or PA1212 |
|  | b) layer I |
|  | c) layer II |
|  | d) layer made from a molding composition based on PA6, PA66, and/or PA6/66 |
|  | e) regrind layer |
|  | f) layer made from a molding composition based on PA6, PA66, and/or PA6/66 |

Firm layer adhesion is achieved in all of these cases.

If the composite having two or more layers is a hollow article or hollow profile, it is preferable for the arrangement to have layer II inside a layer I.

In the simplest case, layer I is a blend made from components a) and c). Since these polymers are substantially incompatible with one another, preparation of the blend at conventional processing temperatures which gives a physical mixture only gives adequate compatibilization in a relatively narrow compositional range. Better results are obtained if the polyamide blend is prepared under conditions under which the two polyamides react with one another to some extent via the terminal groups or via transamidation reactions, to give block copolymers. The temperatures needed for this are generally above 250° C., preferably above 280° C., and particularly preferably above 300° C., and the presence of catalysts, such as hypophosphorous acid, dibutyltin oxide, triphenylphosphine, or phosphoric acid, is required where appropriate. It is also possible to start from a polyamide blend initially prepared under conventional processing conditions and then subject this to solid-phase postcondensation under conditions usual for polyamides, generally at temperatures of from 140° C. to about 5 K below the crystalline melting point $T_m$, preferably at temperatures of from 150° C. to about 10 K below $T_m$, using reaction time of from 2 to 48 hours, preferably from 4 to 36 hours, and particularly preferably from 6 to 24 hours. It is particularly advantageous for one of the polyamides to contain an excess of amino end groups and for the other polyamide to contain an excess of carboxyl end groups. Finally, components a) and c) may also be linked by adding a reactive compound which preferably links the polyamide end groups to one another, for example a bisoxazoline, biscarbodiimide, bisanhydride, diisocyanate, or corresponding compounds having three or more functional groups.

Another preferable way of making components a) and c) compatible with one another is to add an effective amount of component b).

PA6 is prepared by ring-opening polymerization of caprolactam.

PA66 is prepared by polycondensation of hexamethylenediamine and adipic acid. Exactly as with PA6, there is a wide variety of commercially available grades.

PA6/66 is a copolycondensate based on the monomers caprolactam, hexamethylenediamine, and adipic acid.

The polyamine-polyamide copolymer is prepared using the following monomers:

a) from 0.5 to 25% by weight, preferably from 1 to 20% by weight, and particularly preferably from 1.5 to 16% by weight, based on the polyamine-polyamide copolymer, of a polyamine having at least 4, preferably at lead 8, and particularly preferably at least 11, nitrogen atoms and having a number-average molar mass $M_n$ of at least 146 g/mol, preferably at least 500 g/mol, and particularly preferably at least 800 g/mol, and b) polyamide-forming monomers selected from lactams, ω-aminocarboxylic acids, and/or equimolar combinations of diamine and dicarboxylic acid.

The ranges given above for (a) each independently include all values and subranges therebetween, including 0.9, 2, 3, 4, 5, 10, 15, 17, 22 and 24% by weight, based on the polyamine-polyamide copolymer, of the polyamine; 5, 6, 7, 9, 10, 12, 14, and 16 nitrogen atoms; and 147, 148, 150, 200, 225, 250, 300, 400, 525, 600, 700, 900, and 1000 g/mol.

In one preferred embodiment the amino group concentration in the polyamine-polyamide copolymer is in the range from 100 to 2500 mmol/kg.

Preferred examples of the classes of substances which may be used as polyamine are:

polyvinylamines (Römpp's Chemical Encyclopedia 9th edition, Volume 6, p. 4921, Georg Thieme Verlag Stuttgart 1992);

polyamines prepared from alternating polyketones (DE-A 196 54 058);

dendrimers, such as ((H$_2$N—(CH$_2$)$_3$)$_2$N—(CH$_2$)$_3$)$_2$—N (CH$_2$)$_2$—N((CH$_2$)$_2$—N((CH$_2$—NH$_2$)$_2$)$_2$(DE-A-196 54 179), or tris(2-aminoethyl)amine, N,N-bis (2-aminoethyl)-N',N'-bis(2-(bis(2-aminoethyl)amino)ethyl)-1,2-ethanediamine, 3,15-bis(2-aminoethyl)-6,12-bis(2-(bis (2-aminoethyl)amino)ethyl)-9(bis(2-bis(2-aminoethyl) amino)ethyl)amino)ethyl)-3,6,9,12,15-pentaazaheptadecane-1,17-diamine (J. M. Warakomski, Chem. Mat. 1992, 4, 1000-1004);

linear polyethyleneimines which can be prepared by polymerizing 4,5-dihydro-1,3-oxazoles, followed by hydrolysis (Houben-Weyl, Methoden der Organischen Chemie (Methods of Organic Chemistry), Volume E20, pp. 1482–1487, Georg Thieme Verlag Stuttgart, 1987);

branched polyethyleneimines obtainable by polymerizing aziridines (Houben-Weyl, Methoden der Organischen Chemie (Methods of Organic Chemistry), Volume E20, pp. 1482–1487, Georg Thieme Verlag Stuttgart, 1987 and generally having the following distribution of amino groups:

from 25 to 46% of primary amino groups,
from 30 to 45% of secondary amino groups, and
from 16 to 40% of tertiary amino groups. The entire contents of each of the above-mentioned references are hereby incorporated by reference.

In the preferred case, the polyamine has a number-average molar mass $M_n$ of not more than 20,000 g/mol, particularly preferably not more than 10,000 g/mol, and with particular preference not more than 5,000 g/mol. These ranges include all values and subranges therebetween, including 5,500, 7,500, 8,000, 9,000, 11,000, 14,000, 16,000, and 18,000 g/mol.

Lactams and, respectively, ω-aminocarboxylic acids which may be used as polyamide-forming monomers contain from 4 to 19 carbon atoms, in particular from 6 to 12 carbon atoms. These ranges include all values and subranges therebetween, including 5, 7, 8, 9, 10, 11, 13 14, 15, 16, 17 and 18 carbon atoms. Particular preference is given to the use of ε-caprolactam, ε-aminocaproic acid, capryllactam, ω-aminocaprylic acid, laurolactam, ω-aminododecanoic acid, and/or ω-aminoundecanoic acid. Mixtures are possible.

Preferred examples of combinations of diamine and dicarboxylic acid are hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid, and dodecamethylenediamine/2,6-naphthalenedicarboxylic acid. However, besides these it is also possible to use any other combination, such as decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/ω-aminoundecanoic acid, decamethylenediamine/dodecanedioic acid/laurolactam, decamethylenediamine/terephthalic acid/laurolactam, or dodecamethylenediamine/2,6-naphthalenedicarboxylic acid/laurolactam. Mixtures are possible.

In one preferred embodiment, the polyamine-polyamide copolymer is prepared with the additional use of an oligocarboxylic acid selected among from 0.015 to about 3 mol % of dicarboxylic acid and from 0.01 to about 1.2 mol % of tricarboxylic acid, based in each case on the entirety of the polyamide-forming monomers left over. When the equivalent combination of diamine and dicarboxylic acid is used, calculation of these proportions includes each of these monomers individually. If use is made of a dicarboxylic acid, it is preferable to use from 0.03 to 2.2 mol %, particularly preferably from 0.05 to 1.5 mol %, very particularly preferably from 0.1 to 1 mol %, and in particular from 0.15 to 0.65 mol %. If use is made of a tricarboxylic acid, it is preferable to use from 0.02 to 0.9 mol %, particularly preferably from 0.025 to 0.6 mol %, very particularly preferably from 0.03 to 0.4 mol %, and in particular from 0.04 to 0.25 mol %. The concomitant use of the oligocarboxylic acid markedly improves resistance to solvents and to fuel, in particular resistance to hydrolysis and alcoholysis.

The oligocarboxylic acid used may be any desired di- or tricarboxylic acid having from 6 to 24 carbon atoms, for example adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid, and/or trimellitic acid. The above range includes all values and subranges therebetween, including 7, 8, 9, 10, 12, 14, 16, 18, 20, 22 and 23 carbon atoms.

Regulators which may also be used, if desired, are aliphatic, alicyclic, aromatic, aralkylic, and/or alkylaryl-substituted monocarboxylic acids having from 3 to 50 carbon atoms, for exile lauric acids unsaturated fatty acids, acrylic acid, or benzoic acid. Use of these regulators can reduce the concentration of amino groups without altering the form of the molecule. This method can also introduce functional groups, such as double or triple bonds, etc. However, it is desirable for the polyamine-polyamide copolymer to have a substantial proportion of amino groups. The amino group concentration in the copolymer is preferably in the range from 150 to 1,500 mmol/kg, particularly preferably in the range from 250 to 1,300 mmol/kg, and very particularly preferably in the range from 300 to 1,100 mmol/kg. Here, and below, the term "amino groups" includes not only amino end groups, but also any secondary or tertiary amine functions which may be present in the polyamine.

The makeup of the polyamide fraction within the polyamine-polyamide copolymer may vary within a very wide range, since compatibility with the polyamides of components a) and c) is usually present, this apparently being determined by other factors.

The polyamine-polyamide copolymers may be prepared by a variety of processes.

One way is to charge the polyamide-forming monomers and the polyamine together and to carry out the polymerization and, respectively, the polycondensation. The oligocarboxylic acid may be added either at the start or during the course of the reaction.

However, a preferred process has two stages in which first the lactam cleavage and prepolymerization is carried out in the presence of water (an alternative being the direct use and prepolymerization of the corresponding ω-aminocarboxylic acids and, respectively, diamines and dicarboxylic acids). The polyamine is metered in the second step, and the oligocarboxylic acid which may be used concomitantly, where appropriate, is metered in during or after the prepolymerization. The pressure on the mixture is then reduced at temperatures of from 200 to 290° C., and polycondensation takes place in a stream of nitrogen or in vacuo.

Another preferred process is hydrolytic degradation of a polyamide to give a prepolymer and simultaneous or subsequent reaction with the polyamine. The polyamides used are preferably those in which the end-group difference is approximately zero, or in which the oligocarboxylic acid used concomitantly, where appropriate, has previously been incorporated by polycondensation. However, the oligocarboxylic acid may also be added at the start of, or during the course of, the degradation reaction.

These processes can prepare polyamides with an ultrahigh level of branching and with acid values below 40 mmol/kg, preferably below 20 mmol/kg, and particularly preferably below 10 mmol/kg. Approximately complete conversion is achieved after as little as from one to five hours of reaction time at temperatures of from 200° C. to 290° C.

If desired, a vacuum phase lasting a number of hours may be appended as another step of the process. This phase takes at least four hours, preferably at least six hours, and particularly preferably at least eight hours, at from 200 to 290° C. After an induction period of a number of hours, an increase in melt viscosity is then observed, and this is likely to be attributable to a reaction of terminal amino groups with one another, with cleavage of ammonia and chain-linkage.

This further increases the molecular weight, and this is particularly advantageous for extrusion molding compositions.

If there is a desire not to complete the reaction in the melt, solid-phase postcondensation of the polyamine-polyamide copolymer according to known methods is also possible.

PA11 is prepared by polycondensation of ω-aminoundecanoic acid, while PA12 is obtained by ring-opening polymerization of laurolactam. A wide variety of grades of both of these polymers is available commercially.

PA612 is prepared in a known manner by polycondensation of an equivalent mixture of hexamethylenediamine and 1,12-dodecanedioic acid. For the purposes of the present invention, it is preferred when the requirement for heat resistance of the composite having two or more layers is particularly high, e.g., in applications in the engine compartment of motor vehicles.

PA1012 is prepared by polycondensation of an equivalent mixture of 1,10-decanediamine and 1,12-dodecanedioic acid, while PA1212 is obtained in the same way from 1,12-decanediamine and 1,12-dodecanedioic acid.

Mixtures of different polyamides may also be used here with advantage, e.g. PA12/PA1012 or PA12/PA1212. Mixtures of this type have particularly high low-temperature impact strength. They are described by way of example in EP-A-0 388 583, the entire contents of which are hereby incorporated by reference.

Preferably, if the composite having two or more layers is to be used as packaging for food or drink, it may be advantageous to use copolyamides instead of the homopolyamides in an outer layer in order to lower the melting point and thus make the layer heat-sealable. A wide selection of suitable comonomers is available to the skilled worker, e.g. caprolactam, laurolactam, or the equimolar combination of a $C_6$–$C_{12}$ diamine with a $C_6$–$C_{12}$ dicarboxylic acid.

The polyimide molding compositions used may include not more than about 50% by weight of additives selected from impact-modified rubber and/or from conventional auxiliaries and additives. This range includes all values and subranges therebetween, including 0, 2, 4, 6, 8, 10, 15, 20, 25, 30, 35, 40, and 45% by weight.

Impact-modifying rubbers for polyamide molding compositions are known. They contain functional groups which stem from unsaturated functional compounds which have either been incorporated into the main chain by polymerization or have been grafted onto the main chain. The most commonly used are EPM rubber and EPDM rubber, grafted with maleic anhydride by a free-radical route. Rubbers of this type may also be used together with an unfunctionalized polyolefin, e.g. isotactic polypropylene, as described in EP-A-0 683 210, the entire contents of which are hereby incorporated by reference.

The molding compositions may also include relatively small amounts of auxiliaries or additives needed for establishing particular properties. Samples of these are plasticizers, pigments or fillers, such as carbon black, titanium dioxide, zinc sulfide, silicates or carbonates, processing aids, such as waxes, zinc stearate or calcium stearate, flame retardants, such as magnesium hydroxide, aluminum hydroxide, or melamine cyanurate, glass fibers, antioxidants, UV stabilizers, and also additives which give the product antistatic properties or electrical conductivity, e.g. carbon fibers, graphite fibrils, stainless steel fibers, or conductivity black. Mixtures are possible.

In a preferred embodiment the molding compositions include form 1 to 25% by weight of plasticizer, particularly preferably from 2 to 20% by weight, and with particular preference from 3 to 15% by weight. These ranges include all values and subranges therebetween, including 5, 6, 9, 10, 12, 14, 16, 19, 22 and 24% by weight.

Plasticizers and their use in polyamides are known. Preferred plasticizers suitable for polyamides can be found in Gächter/Müller, Kunststoffadditive (Plastics Additives), C. Hanser Verlag, 2nd edition, p. 296, the entire contents of which are hereby incorporated by reference.

Examples of conventional compounds suitable as plasticizer are esters of p-hydroxybenzoic acid having from 2 to 20 carbon atoms in the alcohol component, and amides of arylsulfonic acids having from 2 to 12 carbon atoms in the amine component, preferably amides of benzenesulfonic acid.

Examples of plasticizers which may be used are ethyl p-hydroxybenzoate, octyl p-hydroxybenzoate, isohexadecyl p-hydroxybenzoate, N-n-octyltoluenesulfonamide, N-n-butylbenzenesulfonamide, and N-2-ethylhexylbenzenesulfonamide.

EVOH has been known for a long time. It is a copolymer derived of ethylene and vinyl alcohol, and is also sometimes termed EVAL. The ethylene content in the copolymer is generally from 25 to 60 mol %, and in particular from 28 to 45 mol %, which ranges include all values and subranges therebetween, including 30, 35, 40, 50, and 55 mol %. A wide variety of grades is commercially available. Mention may be made, for example, of the Kuraray EVAL Europe company publication "Introduction to Kuraray EVAL™ Resins", version 1.2/981, the entire contents of which are hereby incorporated by reference.

One embodiment of the composite of the invention, having two or more layers, is a tube, a filler pipe, or a container, in particular for conducting or storing liquids or gases. A tube of this type may be of straight or corrugated design, or may merely have corrugated sections. Corrugated tubes are known and described in e.g. U.S. Pat. No. 5,460,771, the entire contents of which are hereby incorporated by reference. Especially preferable applications of composites of this type having two or more layers are their use as fuel piping, as filler pipes for tanks, as vapor lines (i.e. piping which conveys fuel vapors, e.g. ventilation piping), as fuel-pump piping, as coolant piping, as air-conditioner piping, or as fuel containers.

The composite of the invention, having two or more layers, may also be a flat composite, such as a film, for example a film for the packaging of food or drink, utilizing the barrier action of the EVOH for gases, e.g. oxygen and carbon dioxide.

When the composite of the invention, having two or more layers, is used for carrying or storing combustible liquids, gases or dusts, e.g. fuel or fuel vapors, it is preferable for one of the layers of the composite, or an additional internal layer, to be rendered electrically conductive. This may be achieved by compounding with an electrically conductive additive by any of the known methods. Examples of conductive additives which may be used are conductivity black, metal flakes, metal powders, metallized glass beads, metallized glass fibers, metal fibers (such as those made from stainless steel), metallized whiskers, carbon fibers (including metallized carbon fibers), intrinsically conductive polymers, or graphite fibrils. It is also possible to use mixtures of various conductive additives.

In the preferred case, the electrically conductive layer is in direct contact with the medium to be conveyed or to be held, and its surface resistivity is not more than $10^9$ Ω/square. The test method for determining resistance in pipes having two or more layers is explained in SAE J 2260 (November 1996, paragraph 7.9), the entire contents of which are hereby incorporated by reference.

If the composite of the invention, having two or more layers, is designed as a hollow article or hollow profile (e.g. tube) this may also have an additional outer elastomer coating. Suitable materials for the outer coating process are either crosslinking rubber compositions or else thermoplastic elastomers. The outer coating may be applied, either with or without the use of an additional adion promoter, to the composite having two or more layers, for example by way of extrusion via a crosshead die, or by passing a prefabricated elastomer hose over the finished extruded tube having two or more layers. The thickness of the outer coating is generally from 0.1 to 4 nm, preferably from 0.2 to 3 mm, which ranges include all values and subranges therebetween, including 0.3, 0.4, 0.5, 0.8, 1, 1.1, 1.5, 2, 2.1, 2.5, and 3.5 mm.

Examples of suitable elastomers are chloroprene rubber, ethylenepropylene rubber (EPM), ethylene-propylenediene rubber (EPDM), epichlorohydrin rubber (ECO), chlorinated polyethylene, acrylate rubber, chlorosulfonated polyethylene, silicone rubber, plasticized PVC, polyetheresteramides and polyetheramides.

The composite having two or more layers may be manufactured in one or more stages, for example by single-stage processes using multicomponent injection molding or coextrusion or coextrusion blow molding (including, for example, 3D blow molding, parison extrusion into the open half of a mold, 3D parison manipulation, suction blow molding, 3D suction blow molding, or sequential blow molding), or by processes having two or more stages, e.g. as described in U.S. Pat. No. 5,554,425, the entire contents of which are hereby incorporated by reference.

EXAMPLES

Having generally described this invention, a fiber understanding can be obtained by reference to certain specific examples which are provided herein for purposes of illustration only and are not intended to be limiting unless otherwise specified.

The following components and molding compositions were used in the examples:
VESTAMID® X7293, a plasticized and impact-modified extrusion molding composition based on PA12 from Degussa AG, Dusseldorf
VESTAMID® ZA7295, an extrusion molding composition made from PA12 from Degussa AG, Dusseldorf
ULTRAMID® B4, a PA6 from BASF AG, Ludwigshafen
ULTRAMID® B5W, a PA6 from BASF AG, Ludwigshafen
VESTAMID® D22, a high-viscosity PA612 from Degussa AG, Dusseldorf
EVAL® F101, an EVOH from KURARAY, having 32 mol % of ethylene
EXXELOR® VA1803, a maleic-anhydride-functionalized ethylene-propylene rubber from EXXON
Polyethyleneimine-PA6 Copolymer:
4.78 kg of caprolactam were melted in a heating vessel at from 180 to 210° C., and transferred to a pressure-tight polycondensation vessel. 250 ml of water and 57 ppm of hypophosphorous acid were then added. Caprolactam cleavage was carried out at 280° C. under autogenic pressure. The pressure was then reduced within a period of 3 h to a residual water vapor pressure of 3 bar, and 230 g of polyethyleneimine (LUPASOL® G 100, BASF AG, Ludwigshafen) were added. The pressure was then reduced to atmospheric pressure, and polycondensation took place at 250° C. for 2 h, under a stream of nitrogen. The clear melt was discharged as extrudate through a melt pump, cooled in a water bath, and then pelletized. The resultant copolymer had a polyethyleneimine fraction of 4.5% by weight and a PA6 fraction of 95.5% by weight.

Example 1

A Berstorff ZR 25 twin-screw extruder was used to prepare an intimate mixture of 35.3% by weight of VESTAMID® D22, 48.1% by weight of ULTRAMID® B5W, 10.7% by weight of the polyethyleneimine-PA6 copolymer, and 5.4% by weight of EXXELOR® VA1803 at 280° C., and the mixture was extruded, pelletized and dried.

This mixture was used to coextrude a four-layer tube with external diameter 8 mm and total wall thickness 1 mm, the specific layer configuration being as follows:
Outer layer (0.3 mm) made from a plasticized, impact-modified PA612 extrusion molding composition,
2nd layer (0.1 nm) made from the mixture prepared at the outset,
3rd layer (0.15 mm) made from EVAL® F101,
Inner layer (0.45 mm) made from a plasticized, impact-modified PA6 molding composition.
Permanent adhesion was achieved at all of the phase boundaries here, Comparative Example 1

A three-layer tube was coextruded and differed from the tube of example 1 only in that the 2nd layer made from the mixture prepared at the start in example 1 was omitted, with a resultant change in the thickness of the outer layer. The layer configuration of the tube was therefore as follows:
Outer layer (0.4 mm) plasticized impact-modified PA612 extrusion molding composition,
Middle layer (0.15 mm) EVAL® F101,
Inner layer (0.45 mm) plasticized, impact-modified PA6 molding composition.
No adhesion was achieved here between outer layer and middle layer.

Example 2

A Berstorff 25 twin-screw extruder was used to prepare, at 320° C., an intimate mixture of 8.1 kg of VESTAMID® ZA 7295 and 9.0 kg of ULTRAMID® B4, and the mixture was extruded, pelletized and dried. There was observed here to be some extent of transamidation reactions leading to block copolymers.

This mixture was used to coextrude a four-layer tube with external diameter 8 mm and total wall thickness 1 mm, the specific layer configuration being as follows:
Outer layer (0.3 mm) made from VESTAMID® X7293,
2nd layer (0.1 mm) made from the mixture prepared at the outset,
3rd layer (0.15 mm) made from EVAL® F101,
Inner layer (0.45 mm) made from a plasticized, impact-modified PA6 molding composition.
Permanent adhesion was achieved at all of the phase boundaries here.

Comparative Example 2

A three-layer tube was coextruded and differed from the tube of example 2 only in that die 2nd layer made from the mixture prepared at the start in example 1 was omitted, with a resultant change in the thickness of the outer layer. The layer configuration of the tube was therefore as follows:

Outer layer (0.4 mm) made from VESTAMID® X7293,
Middle layer (0.15 mm) made from EVAL® F101,
Inner layer (0.45 mm) made from a plasticized, impact-modified PA6 molding composition.

No adhesion was achieved here between outer layer and middle layer.

Obviously, numerous modifications and variations of the present invention are possible in light of the above teachings. It is therefore to be understood that within the scope of the appended claims, the invention may be practiced otherwise than as specifically described herein.

This application is based on German patent application DE 100 64 333.7, filed Dec. 21, 2000, the entire contents of which being hereby incorporated by reference.

The invention claimed is:

1. A layered composite, comprising the following layers:
(I) a layer I composition comprising:
  (a) from 0 to 80 parts by weight of at least one polyamide selected from the group consisting of PA6, PA66, PA6/66 and mixtures thereof
  (b) from 0 to 100 parts by weight of at least one polyamine-polyamide copolymer comprising the following monomer units:
    (α) from 0.5 to 25% by weight, based on the weight of the polyamine-polyamide copolymer, of at least one polyamine having at least 4 nitrogen atoms and having a number-average molar mass $M_n$ of at least 146 g/mol, and
    (β) at least one polyamide-forming monomer selected from the group consisting of lactam, ω-aminocarboxylic acid, equimolar combination of diamine and dicarboxylic acid, and mixtures thereof,
  wherein component (b) is present; and
  (c) from 0 to 80 parts by weight of at least one polyamide selected from the group consisting of PA11, PA12, PA612, PA1012, PA1212 and mixtures thereof;
  wherein, in said layer I, a total of the parts by weight of (a), (b) and (c) is 100;
  wherein within an entirety of (a) and (b), at least 20 parts by weight of said entirety comprise monomer units selected from the group consisting of caprolactam, combination of hexamethylenediamine/adipic acid, and mixtures thereof and
  wherein within an entirety of (b) and (c), at least 20 parts by weight of said entirety comprise monomer units selected from the group consisting of ω-aminoundecanoic acid, laurolactam, combination of hexamethylenediamine/1,12-dodecanedioic acid, combination of 1,10-decanediamine/1,12-dodecanedioic acid, combination of 1,12-dodecanediamine/1,12-dodecanedioic acid, and mixtures thereof; and
(II) a layer II composition comprising at least one ethylene-vinyl alcohol copolymer;
wherein
the composite comprises the following sequence of layers:
  (i) a layer comprising at least one member selected from the group consisting of PA11, PA12, PA612, PA1012, PA1212, and combinations thereof;
  (ii) layer I;
  (iii) layer II; and
  (iv) a layer comprising at least one member selected from the group consisting of PA6, PA66, PA6/66, and combinations thereof.

2. The composite as claimed in claim 1, wherein the layer I composition comprises at least one member selected from the group consisting of:
  at least 0.5 part by weight of (a),
  at least 0.5 part by weight of (b),
  at least 0.5 part by weight of(c),
  and combinations thereof.

3. The composite as claimed in claim 1, wherein the layer I composition comprises at least one member selected from the group consisting of:
  at least 10 parts by weight of (a),
  at least 2 parts by weight of (b),
  at least 10 parts by weight of (c),
  and combinations thereof.

4. The composite as claimed in claim 1, wherein the layer I composition comprises at least one member selected from the group consisting of:
  at least 20 parts by weight of (a),
  at least 5 parts by weight of (b),
  at least 20 parts by weight of (c),
  and combinations thereof.

5. The composite as claimed in claim 1, wherein the layer I composition comprises at least one member selected from the group consisting of:
  at least 30 parts by weight of(a),
  at least 10 parts by weight of(b),
  at least 30 parts by weight of(c),
  and combinations thereof.

6. The composite as claimed in claim 1, wherein the layer I composition comprises at least one member selected from the group consisting of:
  at most 70 parts by weight of (a),
  at most 80 parts by weight of (b), and
  at most 70 parts by weight of(c).

7. The composite as claimed in claim 1, wherein the layer I composition comprises at least one member selected from the group consisting of:
  at most 60 parts by weight of (a),
  at most 60 parts by weight of (b), and
  at most 60 parts by weight of (c).

8. The composite as claimed in claim 1, wherein the layer I composition comprises not more than 40 parts by weight of(b).

9. The composite as claimed in claim 1, wherein the polyamine-polyamide copolymer (b) comprises from 1 to 20% by weight of the polyamine (α).

10. The composite as claimed in claim 1, wherein the polyamine-polyamide copolymer (b) comprises from 1.5 to 16% by weight of the polyamine (α).

11. The composite as claimed in claim 1, wherein the polyamine (α) comprises at least 8 nitrogen atoms.

12. The composite as claimed in claim 1, wherein the polyamine (α) comprises at least 11 nitrogen atoms.

13. The composite as claimed in claim 1, wherein the polyamine (α) has a number-average molar mass $M_n$ of at least 500 g/mol.

14. The composite as claimed in claim 1, wherein the polyamine (α) has a number-average molar mass $M_n$ of at least 800 g/mol.

15. The composite as claimed in claim 1, wherein an amino group concentration in the polyamine-polyamide copolymer (b) is in the range from 100 to 2,500 mmol/kg.

16. The composite as claimed in claim 1, wherein the layer I composition comprises at least one block copolymer comprising (a) and (c) monomer units.

17. The composite as claimed in claim 1, wherein the composite comprises two of the I layers.

18. The composite as claimed in claim 1, further comprising at least one regrind layer.

19. The composite as claimed in claim 1, comprising at least one outer layer comprising at least one member selected from the group consisting of PAL11, PA12, PA612, PA1012, PA1212, and combinations thereof.

20. The composite as claimed in claim 1, comprising at least one electrically conductive layer.

21. The composite as claimed in claim 1, comprising at least one innermost layer and further comprising at least one electrically conductive layer adjacent to the innermost layer.

22. The composite as claimed in claim 1, wherein the polyamides in at least one of (a), (c) or both comprise not more than 50% by weight of additives.

23. The composite as claimed in claim 1, wherein the composite is in the form of a tube.

24. The composite as claimed in claim 1, wherein at least one region of the composite has a corrugated shape.

25. The composite as claimed in claim 1, wherein the composite is in the form of a hollow article.

26. The composite as claimed in claim 1, comprising an outer elastomer coating.

27. A tubular article selected from the group consisting of fuel pipe, brake-fluid pipe, coolant pipe, hydraulic-fluid pipe, fuel-pump pipe, air-conditioner pipe, and a vapor line, said article comprising the composite as claimed in claim 1.

28. An article selected from the group consisting of a container, fuel container, filler pipe, and filler pipe for a tank, said article comprising the composite as claimed in claim 1.

29. A film, comprising the composite as claimed in claim 1.

30. A method for preparing the composite as claimed in claim 1, comprising:
performing at least one procedure selected from the group consisting of multicomponent injection molding, coextrusion, and coextrusion blow molding said procedure being performed with at least one member selected from the group consisting of the layers I, II, and a combination of layers I and II.

31. A layered composite, comprising the following layers:
(I) a layer I composition comprising:
(a) from 0 to 80 parts by weight of at least one polyamide selected from the group consisting of PA6, PA66, PA6/66 and mixtures thereof;
(b) from 0 to 100 parts by weight of at least one polyamine-polyamide copolymer comprising the following monomer units:
(α) from 0.5 to 25% by weight, based on the weight of the polyamine-polyamide copolymer, of at least one polyamine having at least 4 nitrogen atoms and having a number-average molar mass $M_n$ of at least 146 g/mol, and
(β) at least one polyamide-forming monomer selected from the group consisting of lactam, ω-aminocarboxylic acid, equimolar combination of diamine and dicarboxylic acid, and mixtures thereof,
wherein component (b) is present; and
(c) from 0 to 80 parts by weight of at least one polyamide selected from the group consisting of PA11, PA12, PA612, PA1012, PA1212 and mixtures thereof;
wherein, in said layer I, a total of the parts by weight of (a), (b) and (c) is 100;
wherein within an entirety of (a) and (b), at least 20 parts by weight of said entirety comprise monomer units selected from the group consisting of caprolactam, combination of hexamethylenediamine/adipic acid, and mixtures thereof and
wherein within an entirety of (b) and (c), at least 20 parts by weight of said entirety comprise monomer units selected from the group consisting of ω-aminoundecanoic acid, laurolactam, combination of hexamethylenediamine/1,12-dodecanedioic acid, combination of 1,10-decanediamine!1,12-dodecanedioic acid, combination of 1,12-dodecanediamine/1,12-dodecanedioic acid, and mixtures thereof; and
(II) a layer II composition comprising at least one ethylene-vinyl alcohol copolymer;
wherein the composite comprises a layer sequence I/II/I; and
wherein said composite further comprises at least one layer comprising at least one member selected from the group consisting of PA11, PA12, PA612, PA1012, PA1212, and combinations thereof.

32. The composite as claimed in claim 31, wherein the layer I composition comprises at least one member selected from the group consisting of:
at least 0.5 part by weight of(a),
at least 0.5 part by weight of(b),
at least 0.5 part by weight of(c),
and combinations thereof.

33. The composite as claimed in claim 32, wherein the layer I composition comprises at least one member selected from the group consisting of:
at least 10 parts by weight of (a),
at least 2 parts by weight of (b),
at least 10 parts by weight of(c),
and combinations thereof.

34. The composite as claimed in claim 31, wherein the layer I composition comprises at least one member selected from the group consisting of:
at least 20 parts by weight of (a),
at least 5 parts by weight of (b),
at least 20 parts by weight of(c),
and combinations thereof.

35. The composite as claimed in claim 31, wherein the layer I composition comprises at least one member selected from the group consisting of:
at least 30 parts by weight of(a),
at least 10 parts by weight of (b),
at least 30 parts by weight of (c),
and combinations thereof.

36. The composite as claimed in claim 31, wherein the layer I composition comprises at least one member selected from the group consisting of:
at most 70 parts by weight of(a),
at most 80 parts by weight of(b), and
at most 70 parts by weight of (c).

37. The composite as claimed in claim 31, wherein the layer I composition comprises at least one member selected from the group consisting of:
at most 60 parts by weight of (a),
at most 60 parts by weight of (b), and
at most 60 parts by weight of (c).

38. The composite as claimed in claim 31, wherein the layer I composition comprises not more than 40 parts by weight of (b).

39. The composite as claimed in claim 31, wherein the polyamine-polyamide copolymer (b) comprises from 1 to 20% by weight of the polyamine (α).

40. The composite as claimed in claim 31, wherein the polyamine-polyamide copolymer (b) comprises from 1.5 to 16% by weight of the polyamine (α).

41. The composite as claimed in claim 31, wherein the polyamine (α) comprises at least 8 nitrogen atoms.

42. The composite as claimed in claim 31, wherein the polyamine (α) comprises at least 11 nitrogen atoms.

43. The composite as claimed in claim 31, wherein the polyamine (α) has a number-average molar mass $M_n$ of at least 500 g/mol.

44. The composite as claimed in claim 31, wherein the polyamine (α) has a number-average molar mass $M_n$ of at least 800 g/mol.

45. The composite as claimed in claim 31, wherein an amino group concentration in the polyamine-polyamide copolymer (b) is in the range from 100 to 2,500 mmol/kg.

46. The composite as claimed in claim 31, wherein the layer I composition comprises at least one block copolymer comprising (a) and (c) monomer units.

47. The composite as claimed in claim 31, further comprising at least one regrind layer.

48. The composite as claimed in claim 31, wherein the composite comprises the following sequence of layers:
  (a) a layer comprising at least one member selected from the group consisting of PA11, PA12, PA612, PA1012, PA1212, and combinations thereof;
  (b) layer I;
  (c) layer II;
  (d) layer I; and
  (e) a layer comprising at least one member selected from the group consisting of PA11, PA12, PA612, PA1012, PA1212, and combinations thereof.

49. The composite as claimed in claim 31, comprising at least one outer layer comprising at least one member selected from the group consisting of PA11, PA12, PA612, PA1012, PA1212, and combinations thereof.

50. The composite as claimed in claim 31, comprising at least one electrically conductive layer.

51. The composite as claimed in claim 31, comprising at least one innermost layer and further comprising at least one electrically conductive layer adjacent to the innermost layer.

52. The composite as claimed in claim 31, wherein the polyamides in at least one of (a), (c) or both comprise not more than 50% by weight of additives.

53. The composite as claimed in claim 31, wherein the composite is in the form of a tube.

54. The composite as claimed in claim 31, wherein at least one region of the composite has a corrugated shape.

55. The composite as claimed in claim 31, wherein the composite is in the form of a hollow article.

56. The composite as claimed in claim 31, comprising an outer elastomer coating.

57. A tubular article selected from the group consisting of fuel pipe, brake-fluid pipe, coolant pipe, hydraulic-fluid pipe, fuel-pump pipe, air-conditioner pipe, and a vapor line, said article comprising the composite as claimed in claim 31.

58. An article selected from the group consisting of a container, fuel container, filler pipe, and filler pipe for a tank, said article comprising the composite as claimed in claim 37.

59. A film, comprising the composite as claimed in claim 31.

60. A method for preparing the composite as claimed in claim 31, comprising:
  performing at least one procedure selected from the group consisting of multicomponent injection molding, coextrusion, and coextrusion blow molding said procedure being performed with at least one member selected from the group consisting of the layers I, II, and a combination of layers I and II.

* * * * *